Nov. 9, 1965   R. F. BOYLE ETAL   3,216,453
ROLLING TAPE METERING VALVE
Filed July 25, 1963   2 Sheets-Sheet 1
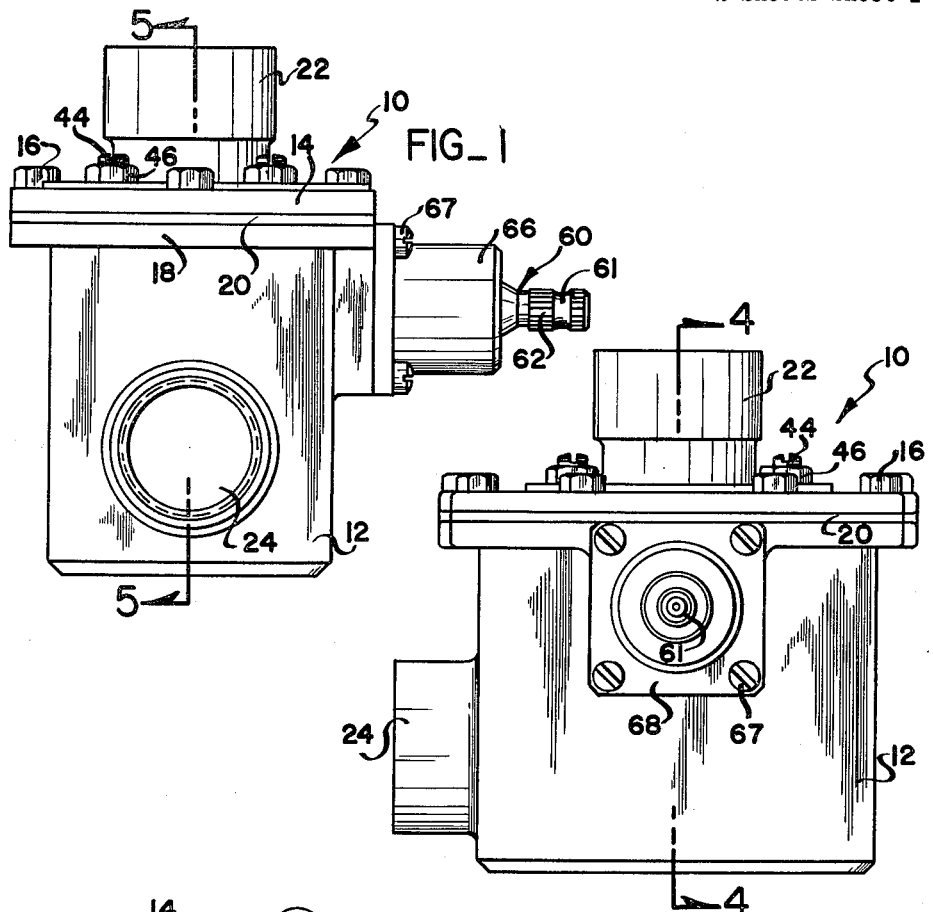
FIG_1
FIG_2
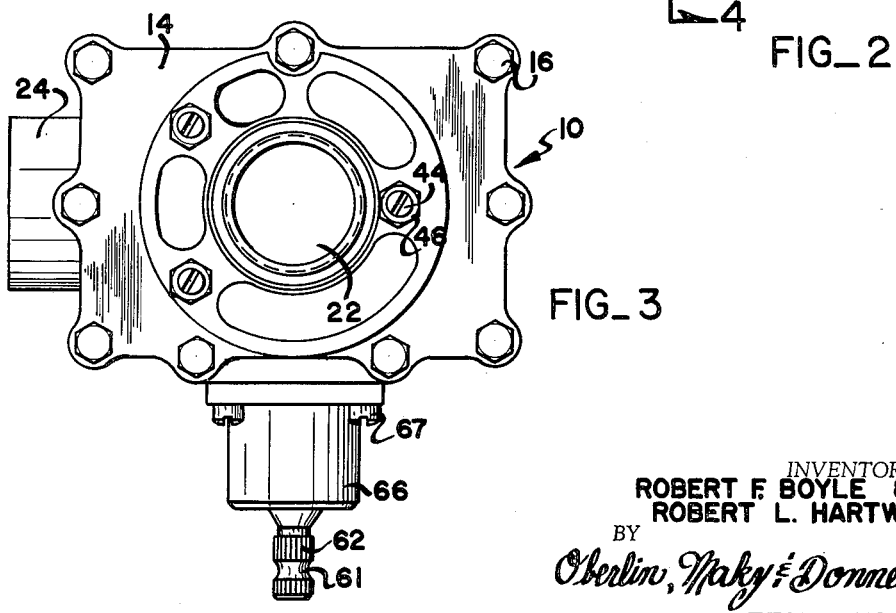
FIG_3
INVENTORS
ROBERT F. BOYLE &
ROBERT L. HARTWIG
BY
Oberlin, Maky & Donnelly
ATTORNEYS

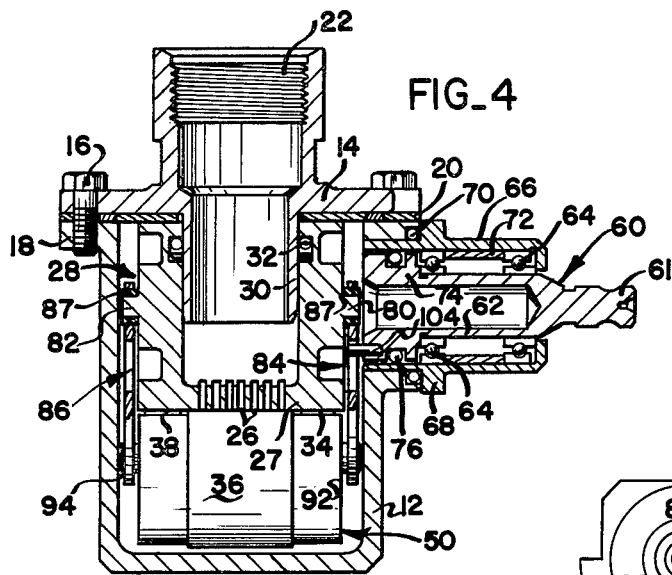
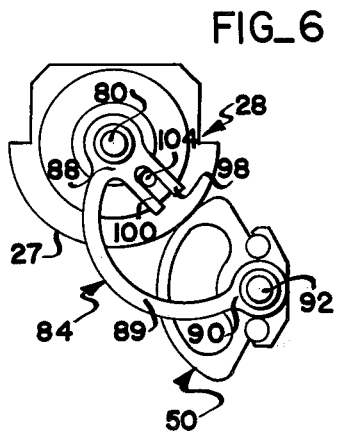
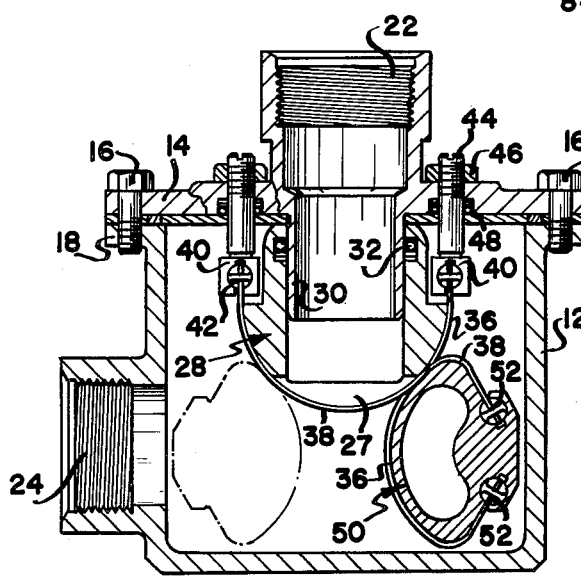

United States Patent Office 3,216,453
Patented Nov. 9, 1965

3,216,453
ROLLING TAPE METERING VALVE
Robert F. Boyle and Robert L. Hartwig, Kalamazoo, Mich., assignors to PneumoDynamics Corporation, Cleveland, Ohio, a corporation of Delaware
Filed July 25, 1963, Ser. No. 297,606
12 Claims. (Cl. 137—625.3)

The present invention relates in general to flow control apparatus and, more particularly, to an improved rolling tape metering valve for accurately metering fluid flow therethrough responsive to adjustment means operatively associated therewith.

In metering valves of the rolling tape type, a flexible tape member is interconnected between a generally curved valve seat and a valve closing member, whereby rotation of one of said members relative to the other effects a partial or complete closing of the fluid passage or passages in the valve seat by the tape member thereby to meter the fluid through said valve. It is of course necessary for proper functioning of the metering valve to maintain the relatively rotatable members in firm engagement in their adjusted position, and means are accordingly provided for sufficiently tensioning the flexible tape to withstand the maximum pressure of the fluid being controlled. Such tensioning means in existing metering valves of this type have proved generally objectionable for several reasons, two of which are the required frequent adjustment thereof and the required balancing of the flexible tapes in all positions of adjustment.

A primary object of the present invention is to provide a rolling tape metering valve having an improved means for maintaining the valve seat and the relatively movable valve closing cylinder in their adjusted position by spring tensioning means pivotally mounted on the valve seat and the valve closing cylinder and movable with the latter to uniformly urge the valve closing cylinder, and more particularly the flexible, valve closing tape carried thereby, into firm engagement with the stationary valve seat for all positions of adjustment.

A further object is to provide such a spring tensioning means which requires no adjustment subsequent to manufacture and assembly thereof.

Yet another object is to provide a rolling tape metering valve comprised of non-precision and thus relatively inexpensively manufactured parts, the valve, however, being capable of precise adjustment.

Other objects of the present invention include the provision of a rolling tape valve wherein there is no sliding friction between the relatively movable members, wherein dirt or fines do not clog the interface between the relatively movable members nor adhere to the tapes connected thereto, and wherein the adjustment thereof is insensitive to temperature and pressure changes.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a front elevational view of the rolling tape valve constructed in accordance with the present invention;

FIG. 2 is a side elevational view of such rolling tape valve;

FIG. 3 is a top plan view of the rolling tape valve;

FIG. 4 is a cross sectional view taken through the rolling tape valve of the present invention, taken on lines 4—4 of FIG. 2;

FIG. 5 is a vertical cross-sectional view taken on lines 5—5 of FIG. 1; and

FIG. 6 is a detailed view of the spring link means for maintaining the valve seat in the valve closing member in uniform firm engagement.

Referring now in more detail to the drawings, wherein like parts are designated by like reference characters, the rolling tape metering valve embodying the present invention is generally indicated at 10 and comprises a valve housing 12 and a valve cover 14 rigidly mounted thereto by means of bolts 16 which extend through aligned openings in said cover and in outwardly extending peripheral flange 18 of the housing 12, as clearly seen in FIGS. 4 and 5. A sealing plate 20 is provided for sealing such connection. The cover 14 is provided with an outlet port 22 and the housing 12 is provided with inlet port 24, both of which are internally threaded for receiving fluid conduits (not shown) leading from and to, respectively, the metering valve, in normal fashion. It should be understood that although the illustrated embodiment comprises but a single outlet, the scope of the present invention broadly encompasses plural outlet valves as well, as will presently be apparent.

The fluid flowing to the inlet port 24 communicates with the entire interior of the valve and with the outlet port 22 through a plurality of spaced ports or passages 26 provided in the bottom of the lower curved section 27 of a metering cylinder generally indicated at 28. The curved section 27 of the metering cylinder 28 forms a valve seat, the passages 26 therein being selectively closed by a movable valve closing means to be hereinafter described, whereby the fluid flow through the valve can be effectively metered or entirely shut off. Each of the passages 26 is preferably rectangular in reference to its transverse cross section whereby the progressive closing of such passage by such valve closing means provides a lineal metering of the fluid through the valve. Such lineal metering comprises a marked advantage in regard to fluid flow control over non-lineal metering necessarily resulting from the use of a circular fluid passage or passages.

The metering cylinder 28 is press fitted over a cylindrical bottom section 30 of the cover 14 and a liquid-tight seal 32 is disposed in an annular groove in the cylinder for sealing the telescopic connection. The cylinder 28 is provided with a flat top surface which tightly abuts the bottom of the sealing plate 20.

A plurality of adjacently disposed flexible tapes or bands 34, 36 and 38 are wrapped around the curved section 27 of the metering cylinder, the intermediate band 36 adapted to engage that portion of the curved section 27 having the fluid passages 26. Each of said tapes 34, 36 and 38 is securely mounted at the upper end thereof by means of tape retaining members 40 each of which is adapted to receive clamping rivets 42 for securely connecting the associated tape thereto. The tape retainers 40 are securely mounted, preferably by welding, to terminal bolts 44, two of which are shown in FIG. 5 for convenience of illustration, the bolts extending upwardly through the sealing plate 20 and through threaded openings in the cover 14 and being additionally retained in assembled position by means of nuts 46. The bolts 44 are slotted at the outer ends thereof for vertical adjustment of the tape members into tight frictional engagement with the curved section 27 of the cylinder 28 when the valve is assembled. Ordinarily no further adjustment of the bolts 44 is required, the tapes being uniformly tensioned in all positions thereof by novel resilient tensioning means to be described hereinbelow. Annular sealing gaskets 48 are disposed around terminal bolts 44 and are received in grooves formed in the cover 14 for preventing leakage of the fluid outwardly therethrough.

Tapes 34 and 38 are disposed on either side of tape 36 and, referring to FIG. 5, all of such tapes are rigidly secured at their lower ends to a valve closing member generally indicated at 50 by any suitable securing means such as clamping rivets 52. Two of the clamping rivets 52 are provided relatively adjacent the top of the member 50, relative to the FIG. 5 showing thereof, for mounting tapes 34 and 38, and the third connecting means 52, for the tape 36, is provided on the member 50 relatively adjacent the bottom thereof, again relative to the FIG. 5 showing thereof. It will be seen that in the FIG. 5 valve open, position the tape 36 is wrapped around substantially the entire curved surface of the valve closing member 50. It will be noted that the valve closing member 50 is cylindrical over its major working surface, with a radius of curvature less pronounced than the curvature of the curved bottom section 27 of the metering cylinder 28. The means to be described below for uniformly biasing the valve closing member 50 into firm contact with the cylinder 28 permits manufacturing tolerances in the cooperable curved surfaces, such non-precision parts resulting in reduced manufacturing costs. The tapes 34, 36 and 38 can be constructed of any suitable non-corrosive substance such as, e.g., spring steel, the particular material used, however, forming no part of the present invention.

It can be seen from FIG. 4 that tape 36 is of a width in excess of the lateral extent of the passages 26 formed in the metering cylinder 28. Thus, when the tape 36 is rolled over the bottom of the cylinder 28 responsive to movement of the valve closing member 50, the passages 26 will be progressively closed from communication with the inlet 24. It should further be apparent that, depending upon the position of the closing member 50, the passages 26 may be partially as well as completely closed whereby the fluid flow therethrough can be accurately lineally metered.

The position of the valve closing member 50 relative to the metering cylinder 28 is controlled through an operative connection to a control member generally indicated at 60 which includes an input shaft 61, the latter being externally knurled as indicated at 62 to receive a suitable manipulating device, for example a control handle or lever (not shown). Suitable indicia (not shown) are provided for correlating the degree of rotation of the control member 60 with the degree of covering of the passages 26 by the tape 36. The control member 60 further includes a cylindrical portion 62 preferably integrally formed with the shaft 61 and which is rotatably mounted by means of spaced bearings 64 in barrel housing member 66 mounted in an opening in the side wall of the housing 12. Mounting bolts 67, FIGS. 1–3, are provided for such mounting, the bolts extending through openings in an intermediate, annular flange or shoulder 68 preferably integrally formed with the barrel 66. A sealing ring 70 is provided for preventing leakage of fluid outwardly between the housing 12 and the barrel 66. A cylindrical spacer 72 is disposed between the bearings 64 for maintaining the same in their operative, assembled position, the innermost bearing 64 contacting an enlarged diameter end section 74 of the cylinder 62. A sealing ring 76 is similarly provided between the barrel 66 and the cylindrical section 74 for preventing fluid leakage outwardly therethrough.

Referring now to the manner in which the valve closing member 50 is rotated and uniformly biased against the curved valve seat 27 of the metering cylinder 28, the latter is formed with a pair of mounting projections or pins 80 and 82 at opposite sides thereof, the pin 80 being axially aligned with the shaft 61 and the cylinder 62. Mounted on the pins 80 and 82 at opposite sides of the cylinder 28 for pivotal movement relative thereto are spring link members generally indicated at 84 and 86, the structure of the spring link 84 mounted adjacent the control member 60 being shown most clearly in FIG. 6. Self-lubricating sleeves or bushings 87 are preferably disposed around pins 80 and 82 to reduce the friction during rotation of the spring links 84 and 86 thereabout.

The spring link 84 includes an upper, apertured mounting portion 88 mounted on bushing 87, an intermediate spring section 89, and a lower mounting portion 90, the latter being mounted for pivotal movement on pin 92 forming a part of the closing member 50 and extending outwardly therefrom at a side thereof. The spring section 89 serves to resiliently bias the member 50 into firm contact with the curved end section 27 of the metering cylinder 28 during all positions of the closing member 50. The oppositely disposed spring link 86 is of like construction and hence will not be separately described, and is similarly pivotally mounted on the opposite ends of the cylinder 28 and the closing member 50 about pins 82 and 94, respectively. Thus, the closing member 50 is resiliently supported for movement at both sides thereof.

The spring link 84 is provided adjacent the upper mounting portion thereof with a pair of parallel spaced arms 98 and 100 which define therebetween a slot 102 for receiving a pin 104 press fitted in the end portion 74 of the cylinder 62. It will thus be seen that rotation of the shaft 60 and hence the pin 104 will cause movement in the same direction of the spring link 84 about the pin 80. Such movement will similarly effect rotation of the closing member 50 about an axis through pin 92.

The intermediate spring section 89 of the spring link 84, and the corresponding spring section of the oppositely disposed spring link 86, serve to maintain the closing member 50 in firm contact with the curved bottom 27 of the metering cylinder 28 during all positions of the former. It will be seen that such biasing action of the intermediate spring sections will be substantially uniform regardless of the position of the closing member 50 and the degree of rolling and unrolling of the tapes 34, 36 and 38. This uniform biasing action is particularly important due to the fact that the tension on the tapes is substantially less in certain positions of the valve closing member, e.g., in the form shown when the valve closing member 50 is directly below the metering cylinder 28 and the tangent to the contact points is coplanar with the horizontal. The spring links 84 and 86 thereby eliminate the necessity of tensionally balancing the tapes 34, 36 and 38 to achieve uniform firm engagement between the valve and the valve closing member, as in prior art arrangements.

It will also be seen the fluid entering the housing 12 through inlet 24 completely surrounds the cylinder 28, the valve closing member 50 and the tapes 34, 36 and 38, such pressure loading of the tapes against the cylinder 28 thereby assisting the firm contact of the tapes thereagainst. Such fluid pressure also functions to prevent dirt or fines from building up on the valve seat-engaging surface of the tape 36 thereby ensuring a proper seating thereof on such valve seat.

Rotation of the closing member 50 in the above noted manner responsive to rotation of the control member 60 will effect a wrapping of the tape 36 around the curved bottom 27 of the metering cylinder 28 thereby progressively closing the passages 26 to fluid flow therethrough. The fixed connection of the tape 36 at its upper end insures that the closing member 50 will rotate about pins 92 and 94, and not merely slide relative to the metering cylinder 28, responsive to rotation of the control member 60. As the closing member 50 thus wraps the tape 36 progressively over the passages 26, the tapes 34 and 38 disposed on either side of tape 36 will increasingly wrap around the closing member 50 as the latter approaches the upper connections thereof. The tapes 34 and 38 tend better to stabilize the relative movement between the closing member 50 and the stationary cylinder 28.

The operation of the rolling tape metering valve of the present invention should now be apparent from the above description. When the closing member 50 is in its FIG. 5 position, the passages 26 are open and fluid flowing into the valve housing through inlet 24 flows through the passages 26 and leaves the valve through outlet 22. When it is desired to meter the flow through the valve, the control member is rotated the desired degree as indicated by suitable indicia whereby the closing member 50, through the drive connection above described, is rotated about the axis through pins 92 and 94 and the flexible tape 36 is wrapped about the curved bottom 27 of the metering cylinder 28, thereby progressively closing the passages 26. The spring links 84 and 86 serve both to transfer the rotative movement of the shaft 61 to rotative movement of the closing member 50 and to bias the latter during all positions thereof into firm contact with the former. In this regard, the spring force provided by the spring links 84 and 86 is of course in excess of the maximum fluid pressure encountered in the housing 12 whereby the setting of the closing cylinder 50 relative to the passages 26 is insensitive to fluid pressure, as well as fluid temperature. The full angular travel of the shaft 61, for example approximately 90°, causes the valve closing member 50 to rotate to its dashed line, FIG. 5 position, whereby the passages 26 in the metering cylinder 28 are completely closed by the tape 36 thereby closing the outlet 22 to fluid flow. The subsequent opening of the passages 26 is accomplished in like manner through counter-clockwise rotation of the shaft 61.

It will thus be seen that the present invention provides a highly simplified metering valve composed of but relatively few parts. Moreover, the novel construction of such rolling tape metering valve does not require that the component parts thereof be precisely manufactured or machined. Nevertheless, highly precise metering can be achieved therewith. Further, the novel spring tensioning means of the present invention uniformly firmly maintains the closing cylinder in engagement with the curved surface of the metering cylinder during all positions of the former. Moreover, once the novel spring tensioning means has been assembled, no further adjustment thereof is required.

Other modes of applying the principle of the invention may be employed, change being made as regards the details described, provided the features stated in any of the following claims or the equivalent of such be employed.

We therefore particularly point out and distinctly claim as our invention:

1. A fluid control valve comprising relatively movable valve and valve closing members, said valve member having passage means for the passing of fluid therethrough, a flexible tape attached at one end to said valve closing member and adapted to close said passage means responsive to relative movement between said valve member and said valve closing member, means for effecting such relative movement between said valve member and said valve closing member, and means interconnecting said valve member and said valve closing member, said interconnecting means biasing said valve member and said valve closing member into firm engagement with each other substantially equally in all positions of relative movement therebetween.

2. A fluid control valve comprising a housing, relatively movable valve and valve closing members disposed within said housing, said valve member having fluid passage means formed therein for the passing of fluid therethrough, a flexible tape having one end attached to said valve closing member and its other end adjustably mounted relative to said housing, said flexible tape being wrapped over said valve member responsive to relative movement between said valve member and said valve closing member thereby progressively closing said passage means, means for effecting such relative movement between said valve member and said valve closing member, and link means interconnecting said valve member and said valve closing member, said link means including an intermediate resilient section biasing said valve member and said valve closing member into firm engagement with each other substantially equally in all positions of relative movement therebetween.

3. The combination of claim 2 wherein said link means further includes an upper portion rotatably journaled on said valve member, a lower portion rotatably journaled on said valve closing member whereby rotation of said upper portion of said link causes rolling movement of said valve closing member over said valve member thereby progressively wrapping the flexible tape over said passage means.

4. A fluid control valve comprising a valve housing, a metering cylinder within said housing having a curved valve seat in the lower portion thereof, said cylinder having fluid passage means formed in said valve seat for the selective passing of fluid through said cylinder, a valve closing member having a curved surface for rolling movement over said valve seat, a flexible tape fixed at one end and secured at its opposite end to said valve closing member for rolling movement therewith, said tape being disposed between said valve seat and said valve closing member for covering said passage means, control means effecting such rolling movement of said valve closing member, and means interconnecting said metering cylinder and said valve closing member, said interconnecting means biasing said metering cylinder and said valve closing member into firm engagement with each other substantially equally in all positions of relative movement therebetween.

5. The combination of claim 4 wherein said interconnecting means comprises a spring link journaled at opposite ends to said metering cylinder and to said valve closing member, said spring link having a resilient intermediate section biasing said valve closing member and said tape member into firm engagement with said valve seat substantially equally in all positions of relative movement therebetween.

6. The combination of claim 5 further including a drive connection between said control means and said spring link, said drive connection comprising a pin carried by said control means and engaging said spring link whereby rotation of said control means effects rotation of said spring link through said drive pin.

7. A fluid control valve comprising a valve housing, a fluid inlet for admitting fluid to said housing, a metering cylinder mounted within said housing, a fluid outlet from said housing, said metering cylinder being formed with a curved valve seat having a plurality of fluid passages for metering flow through said cylinder to said outlet, a valve closing member having a curved surface for rolling movement over said curved valve seat, means disposed at both ends of said metering cylinder and said valve closing member for interconnecting and biasing said cylinder and said valve closing member substantially equally into firm engagement with each other in all positions of relative movement therebetween, means for effecting rolling movement of said valve closing member over said valve seat, and a flexible tape fixed at one end and having its opposite end secured to said valve closing member, said tape being tightly wrapped around said curved surface of said valve closing member whereby rolling movement of said valve closing member causes said tape to firmly wrap itself over said valve seat thereby progressively covering said fluid passages.

8. The combination of claim 7 wherein said interconnecting and biasing means comprise spring link members having upper end portions journaled on said metering cylinder, lower end portions journaled on said valve closing member and intermediate resilient sections to effect such biasing.

9. The combination of claim 8 wherein said means for effecting movement of said valve closing member comprises a control member rotatably mounted in said housing, and drive pin means operatively connecting said control member and one of said spring links.

10. The combination of claim 7 further including a pair of flexible tape members disposed at opposite sides of said tape adapted to cover said passages, each of said pair of flexible tapes being fixed at one end and tightly wrapped around said curved valve seat and secured at its opposite end to said valve closing member for rolling movement therewith.

11. The combination of claim 10 wherein said flexible tapes are constructed and arranged relative to said curved valve seat and said valve closing member so that the tape adapted to cover said passages becomes progressively unwrapped from said valve closing member responsive to rolling movement thereof for closing said passages, and said pair of flexible tapes become progressively more wrapped over said valve closing member during such movement thereby stabilizing such rolling movement of the valve closing member.

12. A metering valve comprising a metering cylinder having a curved valve seat, a plurality of rectangular openings in said cylinder for permitting fluid flow therethrough, a movable valve closing member rollable along said curved valve seat, a flexible tape member attached to said valve closing member and extending between the adjacent surfaces of said valve closing member and said cylinder, means interconnecting said metering cylinder and said valve closing member and biasing said movable valve closing member and said tape into firm engagement with said curved valve seat substantially equally in all positions of relative movement therebetween, means for effecting rolling movement of said valve closing member over said valve seat, said flexible tape thereby progressively closing said openings to lineally meter fluid flow through said cylinder.

References Cited by the Examiner
UNITED STATES PATENTS

| | | | |
|---|---|---|---|
| 19,203 | 1/58 | Osgood | 137—625.3 X |
| 1,104,867 | 7/14 | Blohut | 137—625.28 |
| 2,180,173 | 11/39 | Share | 137—202 |

M. CARY NELSON, *Primary Examiner.*